(12) United States Patent
Kono et al.

(10) Patent No.: US 10,851,720 B2
(45) Date of Patent: Dec. 1, 2020

(54) ACTUATOR

(71) Applicant: DENSO CORPORATION, Kariya (JP)

(72) Inventors: Naoaki Kono, Kariya (JP); Etsugo Yanagida, Kariya (JP); Masashi Yamaguchi, Kariya (JP); Tetsuji Yamanaka, Kariya (JP); Atsushi Tanaka, Kariya (JP); Kunio Namba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/736,110

(22) Filed: Jan. 7, 2020

(65) Prior Publication Data
US 2020/0217254 A1 Jul. 9, 2020

(30) Foreign Application Priority Data

Jan. 9, 2019 (JP) .................. 2019-001515

(51) Int. Cl.
| | |
|---|---|
| *F02D 9/08* | (2006.01) |
| *F02D 41/00* | (2006.01) |
| *F16H 1/20* | (2006.01) |
| *F16H 57/021* | (2012.01) |
| *F16H 57/00* | (2012.01) |
| *G01D 5/14* | (2006.01) |

(Continued)

(52) U.S. Cl.
CPC ......... *F02D 41/0007* (2013.01); *F02D 23/00* (2013.01); *F02D 41/0077* (2013.01); *F16H 1/20* (2013.01); *F16H 57/0031* (2013.01); *F16H 57/021* (2013.01); *G01D 5/142* (2013.01); *F16H 2057/02034* (2013.01); *F16H 2057/02082* (2013.01)

(58) Field of Classification Search
CPC ...... F02B 27/0273; F02D 9/08; F02D 9/1005; F02D 9/101; F02D 9/102; F02M 35/10255
USPC ............... 123/337, 360, 361, 376, 398, 403; 251/305, 308, 337, 355
See application file for complete search history.

(56) References Cited

U.S. PATENT DOCUMENTS

| | | | | | |
|---|---|---|---|---|---|
| 5,069,302 | A | * | 12/1991 | Kageyama | ......... B60G 17/0195 180/197 |
| 2004/0084016 | A1 | * | 5/2004 | Torii | ....................... F02D 11/10 123/399 |

(Continued)

FOREIGN PATENT DOCUMENTS

JP 2003-214194 7/2003

*Primary Examiner* — John Kwon
(74) *Attorney, Agent, or Firm* — Nixon & Vanderhye P.C.

(57) ABSTRACT

An actuator is provided for driving a turbocharging pressure control valve of a turbocharger. The actuator comprises a motor, an output shaft and a speed reduction mechanism for transmitting rotation of the motor to the output shaft by reducing a rotation speed. The speed reduction mechanism includes at least one gear having a shaft hole, a support shaft inserted into the shaft hole and holding the gear rotatably, and wall portions provided at both ends of the support shaft in a manner sandwiching the gear. The speed reduction mechanism further includes a wear powder holding portion provided radially outside an outer periphery of the support shaft and in at least one of two end portions of the shaft hole and the wall portions in a manner to hold wear powder or foreign substance without scattering.

16 Claims, 11 Drawing Sheets

FIRST EMBODIMENT

(51) Int. Cl.
*F02D 23/00* (2006.01)
*F16H 57/02* (2012.01)

(56) References Cited

U.S. PATENT DOCUMENTS

| | | | |
|---|---|---|---|
| 2005/0126536 A1* | 6/2005 | Torii | F02D 11/10 123/399 |
| 2013/0130573 A1* | 5/2013 | Kuriyagawa | B63H 20/00 440/2 |
| 2014/0184204 A1 | 7/2014 | Kouno et al. | |

\* cited by examiner

FIG. 7 FIRST EMBODIMENT
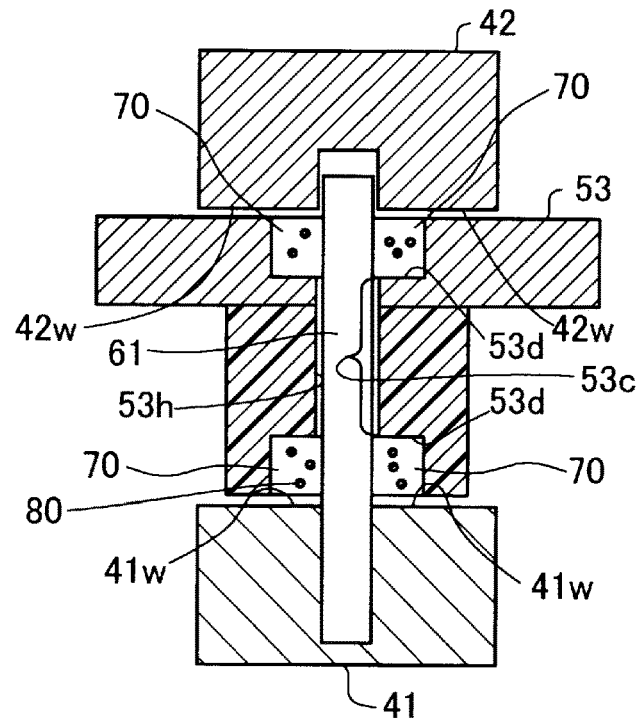
FIG. 8 SECOND EMBODIMENT
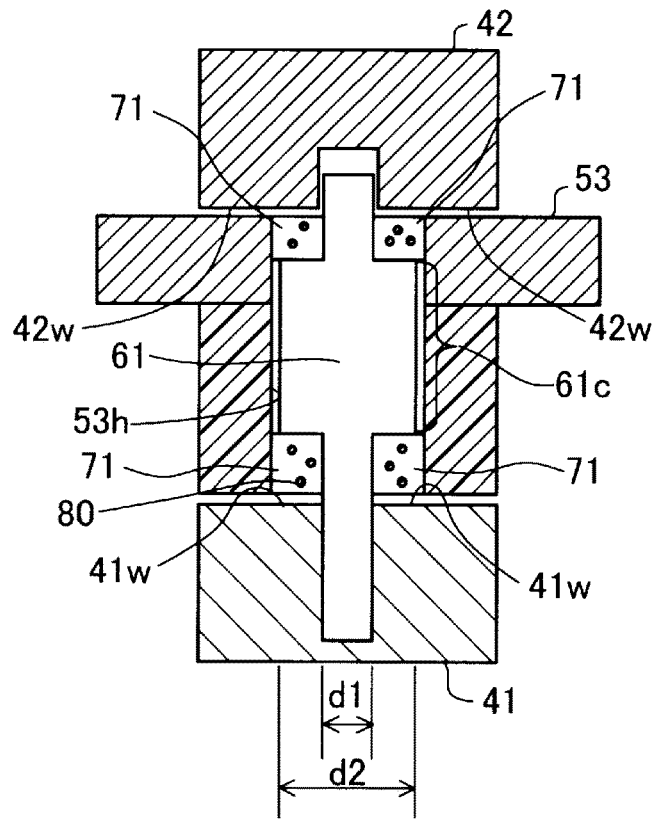

FIG. 9 THIRD EMBODIMENT
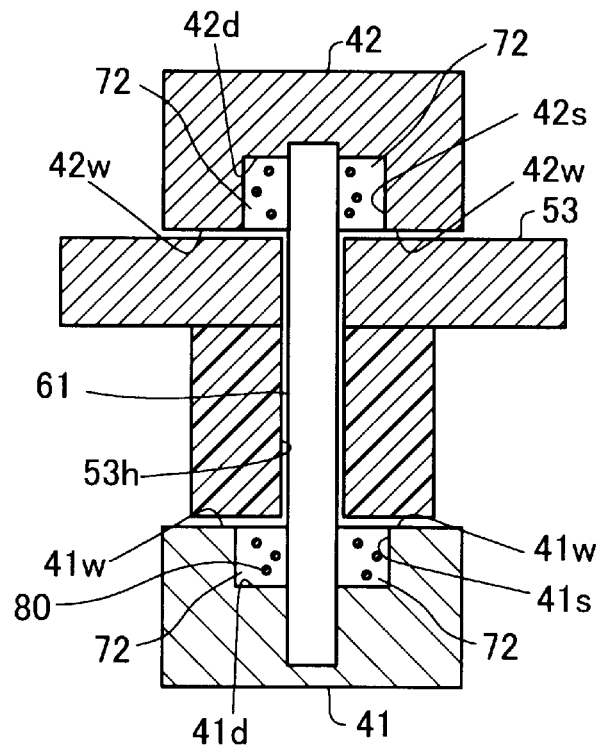
FIG. 10 FOURTH EMBODIMENT
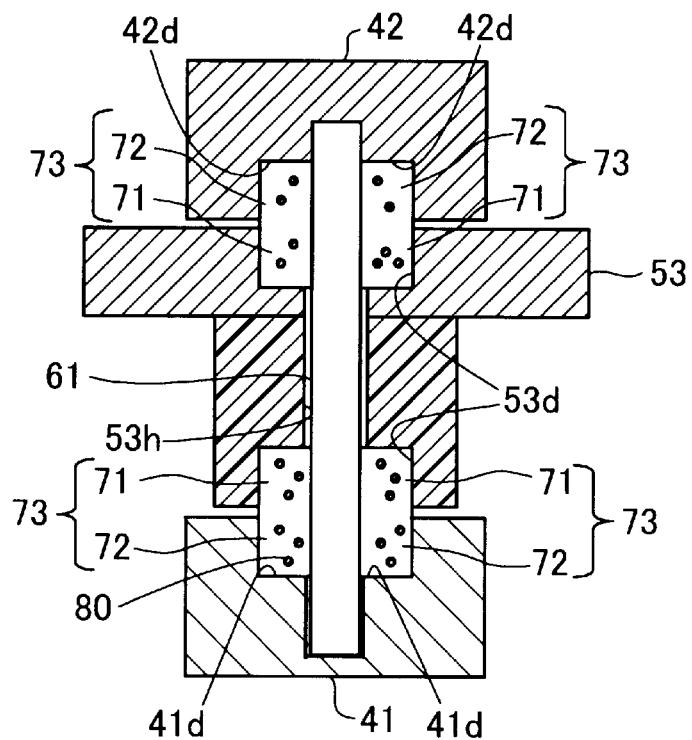

FIG. 11 — FIFTH EMBODIMENT
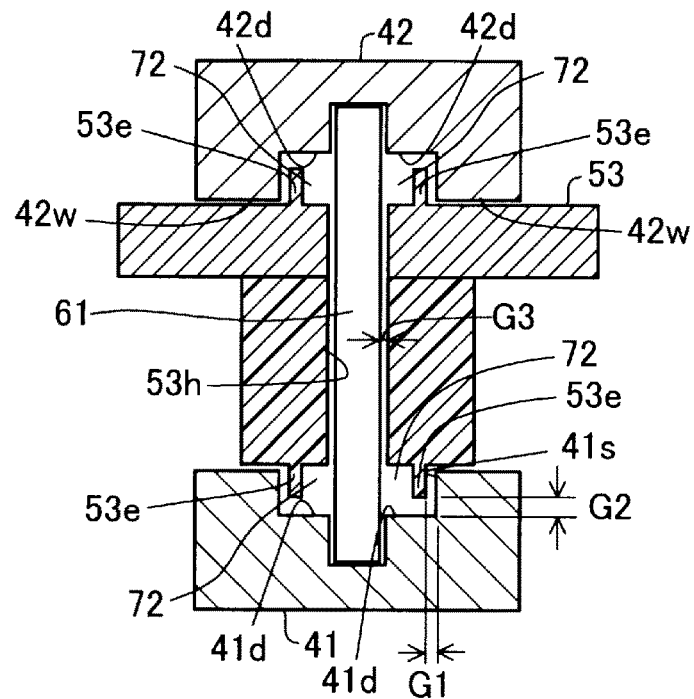
FIG. 12 — SIXTH EMBODIMENT
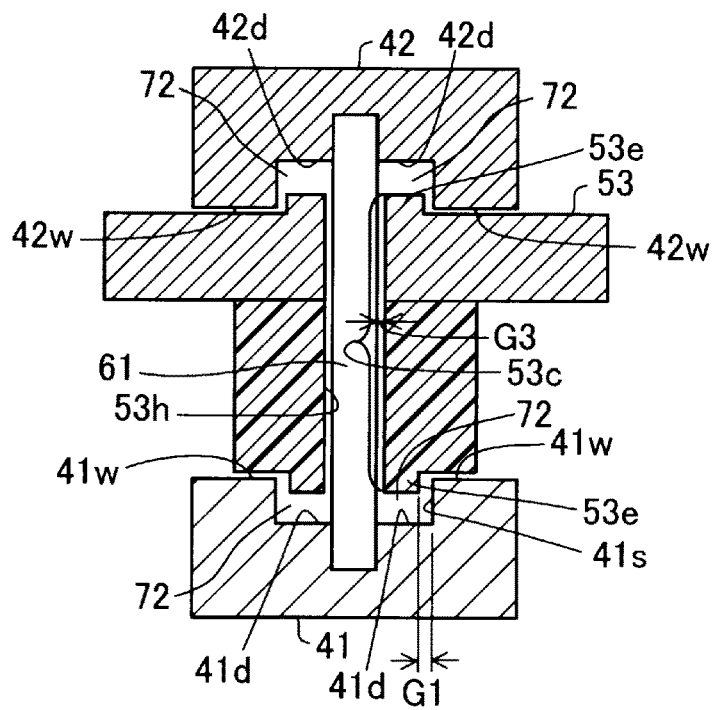

SEVENTH EMBODIMENT

EIGHTH EMBODIMENT

ACTUATOR

CROSS REFERENCE TO RELATED APPLICATION

The present application claims the benefit of priority from Japanese Patent Application No. 2019-1515 filed on Jan. 9, 2019. The entire disclosures of the above application are incorporated herein by reference.

FIELD

The present disclosure relates to an actuator.

BACKGROUND

A conventional actuator is provided with a speed reduction mechanism. The speed reduction mechanism is provided with a spiral groove on an inner peripheral surface of a central hole of a driven gear at a fitting portion between the driven gear and a fixed shaft. The spiral groove is provided as a space so that a foreign substance generated in the fitting portion, such as wear powder of the driven gear, or a foreign substance entering the fitting portion from an outside can stay in the fitting portion.

In the conventional actuator, a shaft makes a line contact with the spiral groove provided on the inner peripheral surface of the central hole of the driven gear. As a result, a surface pressure at the contact portion is increased, and wear of the peripheral surface of the central hole of the driven gear or the shaft is likely to be promoted.

SUMMARY

An actuator according to the present disclosure comprises a motor, an output shaft and a speed reduction mechanism for transmitting rotation of the motor to the output shaft by reducing a rotation speed. The speed reduction mechanism includes at least one gear having a shaft hole, a support shaft inserted into the shaft hole and holding the gear rotatably, and wall portions provided at both ends of the support shaft in a manner sandwiching the gear.

BRIEF DESCRIPTION OF THE DRAWINGS

FIG. 7 is an explanatory view showing a wear powder holding portion of an actuator according to a first embodiment;

FIG. 8 is an explanatory view showing a wear powder holding portion of an actuator according to a second embodiment;

FIG. 9 is an explanatory view showing a wear powder holding portion of an actuator according to a third embodiment;

FIG. 10 is an explanatory view showing a wear powder holding portion of an actuator according to a fourth embodiment;

FIG. 11 is an explanatory view showing a wear powder holding portion of an actuator according to a fifth embodiment;

FIG. 12 is an explanatory view showing a wear powder holding portion of an actuator according to a sixth embodiment;

DETAILED DESCRIPTION OF THE EMBODIMENT

First Embodiment

Figure 1:
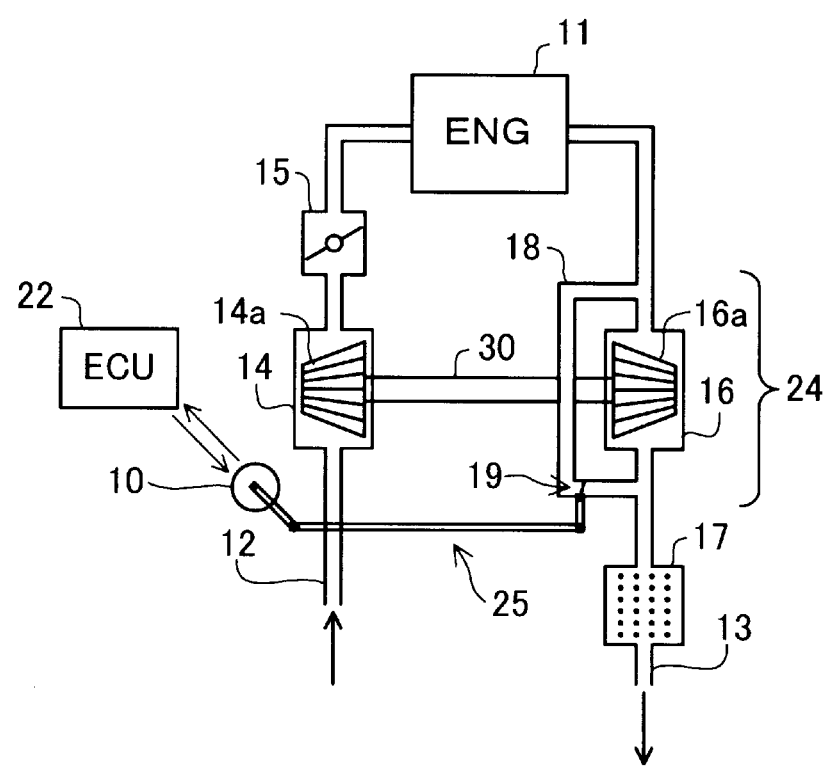
FIG. 1 is a schematic view of an intake/exhaust portion of an engine to which an actuator according to the present disclosure is applied.

As shown in FIG. 1, an actuator 10 is provided in an engine system including an internal combustion engine 11 that is a power source for vehicle travel.

The engine 11 is provided with an intake passage 12 that guides intake air into cylinders of the engine 11 and an exhaust passage 13 that discharges exhaust gas generated in the cylinders into atmosphere. In a middle portion of the intake passage 12, a compressor wheel 14a of an intake compressor 14 of a turbocharger 24 and a throttle valve 15 are provided. The compressor wheel 14a turbocharges intake air into the engine 11. The throttle valve 15 varies the amount of intake air supplied to the engine 11 according to a position of an accelerator pedal (not shown) operated by, for example, a driver, of the vehicle.

In a middle portion of the exhaust passage 13, a turbine wheel 16a of an exhaust turbine 16 of the turbocharger 24 and a catalyst 17 that purifies exhaust gas are provided. The turbine wheel 16a is connected to the compressor wheel 14a by a rotary shaft 30. That is, the turbine wheel 16a is rotated by exhaust energy of the engine 11 so that the compressor wheel 14a is rotated for turbocharging the intake air. The catalyst 17 may be well-known three-way catalyst that uses a monolith structure, and purifies harmful substances contained in the exhaust gas by oxidation and reduction by raising a temperature to an activation temperature by the exhaust gas.

The exhaust passage 13 is further provided with a bypass passage 18 that bypasses the turbine wheel 16a and supplies the exhaust gas in parallel with the turbine wheel 16a. The bypass passage 18 is provided with a waste gate valve 19 which is a turbocharging pressure control valve. When the waste gate valve 19 is opened, a portion of the exhaust gas from the engine 11 is directly supplied to the catalyst 17 through the bypass passage 18. The waste gate valve 19 opens when the pressure of the exhaust gas from the engine 11 exceeds a valve-opening pressure of the waste gate valve 19. The opening and closing of the waste gate valve 19 is also controlled by an ECU (engine control unit) 22. That is, the ECU 22 drives the actuator 10 to open and close the waste gate valve 19 by a link mechanism 25 provided between the actuator 10 and the waste gate valve 19.

Figure 2:
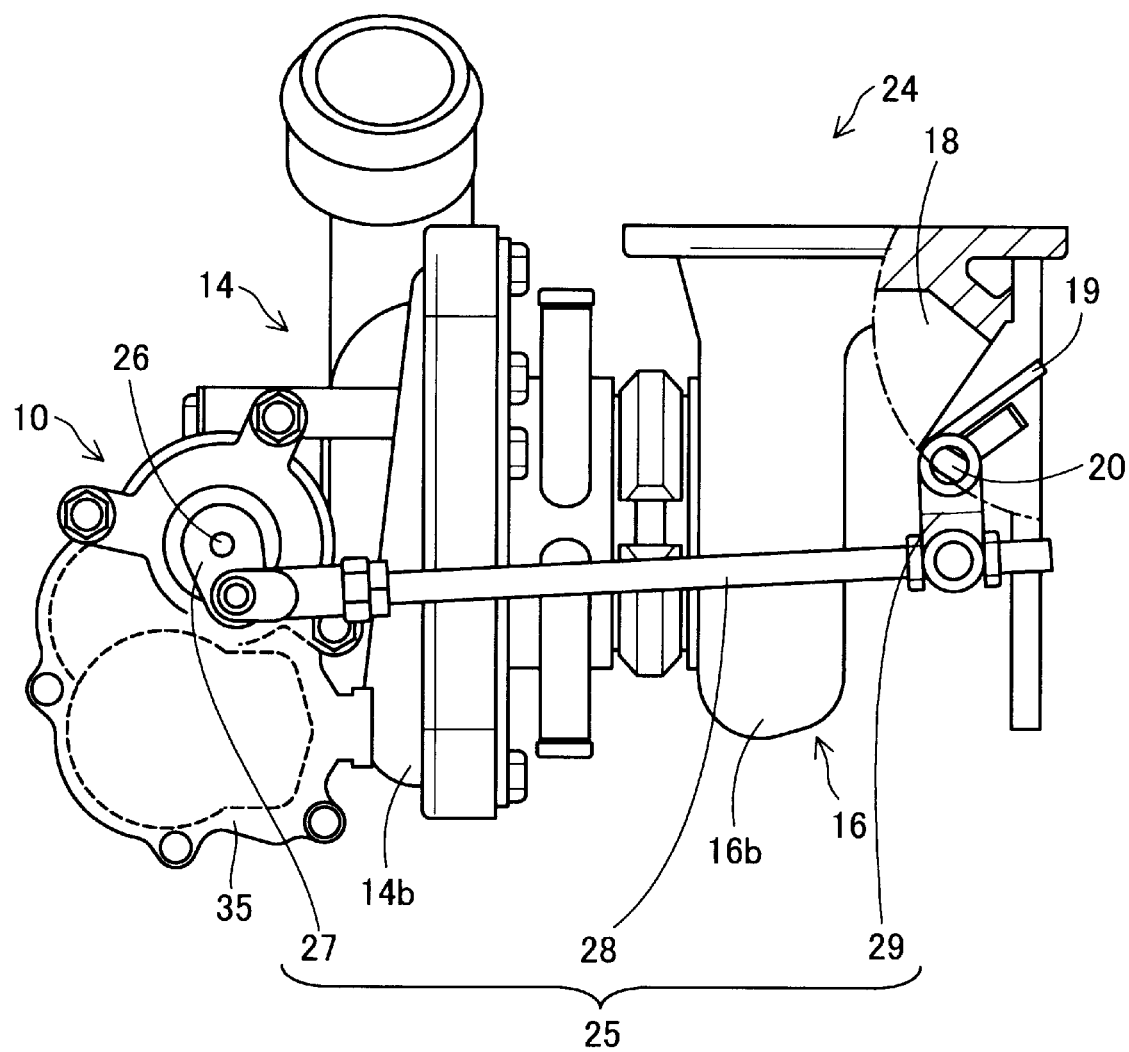
FIG. 2 is an explanatory view of a turbocharger.

As shown in FIG. 2, the turbocharger 24 includes the exhaust turbine 16, the intake compressor 14 and the actuator 10. The exhaust turbine 16 includes the turbine wheel 16a (FIG. 1) that is rotationally driven by the exhaust gas discharged from the engine 11, and a spiral turbine housing 16b that accommodates the turbine wheel 16a therein. The intake compressor 14 includes the compressor wheel 14a (FIG. 1) that rotates in response to a rotational force of the turbine wheel 16a, and a spiral compressor housing 14b that accommodates the compressor wheel 14a therein. The turbine wheel 16a and the compressor wheel 14a are connected by the rotary shaft 25 (FIG. 1).

In addition to the turbine wheel 16a, the bypass passage 18 is provided in the turbine housing 16b. The bypass passage 18 directly guides the exhaust gas flowing into the turbine housing 16b to an exhaust outlet of the turbine housing 16b without supplying the exhaust gas to the turbine wheel 16a. The bypass passage 18 is opened and closed by the waste gate valve 19. The waste gate valve 19 is a swing valve that is rotatably supported by a valve shaft 20 in the turbine housing 16b. The waste gate valve 19 opens when the pressure of the exhaust gas exceeds the valve-opening pressure of the waste gate valve 19, but is also driven by the actuator 10 to open and close.

An actuator housing 35 that houses the actuator 10 is attached to the intake compressor 14 side which is away from the exhaust turbine 16 of the turbocharger 24. In this way, the influence of the heat of the exhaust gas can be avoided. The turbocharger 24 is provided with the link mechanism 25 (FIG. 1) for transmitting the output of the actuator 10 to the waste gate valve 19. As the link mechanism 25, a four-node link mechanism including an actuator lever 27, a rod 28, and a valve lever 29 is employed. The actuator lever 27 is connected to an output shaft 26 of the actuator 10 to be rotated by the actuator 10. The valve lever 29 is coupled to the valve shaft 20. The rod 28 transmits the rotational torque applied to the actuator lever 27 to the valve lever 29.

The operation of the actuator 10 is controlled by the ECU 22 including a microcomputer. Specifically, the ECU 22 controls the turbocharging pressure of the turbocharger 24 by controlling the actuator 10 so as to adjust an opening degree of the waste gate valve 19 when the engine 11 is operated at high speed. Further, the ECU 22 controls the actuator 10 so that the waste gate valve 19 is fully opened to warm up the catalyst 17 when the temperature of the catalyst 17 does not reach a catalyst activation temperature, for example, immediately after a cold starting of the engine 11. As a result, high temperature exhaust gas that is not deprived of heat by the turbine wheel 16a can be directly supplied to the catalyst 17 so that the catalyst 17 can be warmed up in a short time.

Figure 3:
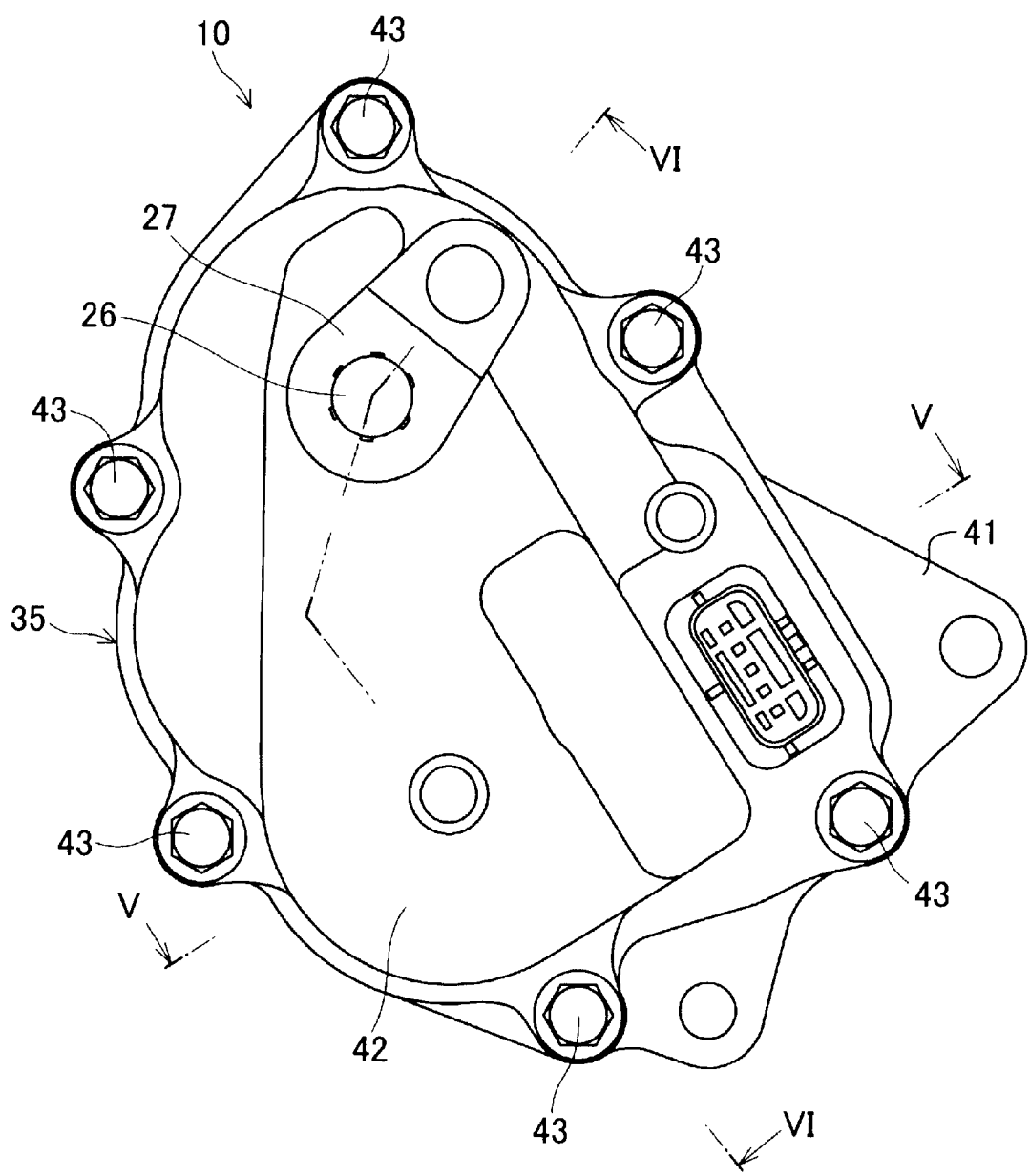
FIG. 3 is a top view of the actuator.

Next, the actuator 10 will be described in more detail with reference to FIGS. 3 to 6. The actuator 10 is accommodated within the actuator housing 35 attached to the intake compressor 14. As shown in FIG. 3, the actuator housing 35 has a first housing portion 41 and a second housing portion 42. The second housing portion 42 is provided as a case 42. The first housing portion 41 and the second housing portion 42 are formed of a metal material such as aluminum, aluminum alloy or steel, for example. Alternatively, the first housing portion 41 and the second housing portion 42 may be formed of resin. The first housing portion 41 and the second housing portion 42 may be formed by any method of die casting, gravity casting, injection molding and pressing. The second housing portion 42 is fastened to the first housing portion 41 by fastening members 43. The output shaft 26 protrudes from the second housing portion 42 and is connected to the actuator lever 27.

Figure 4:
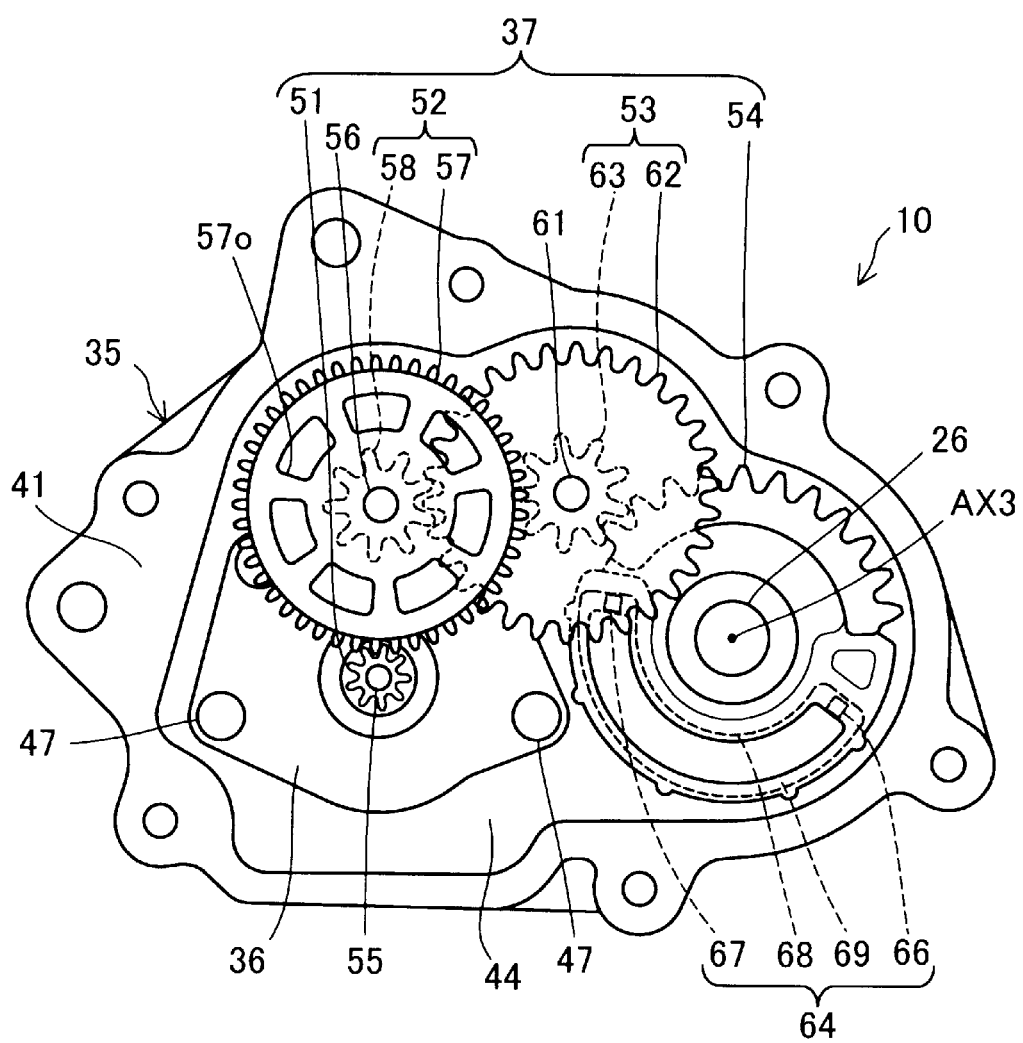
FIG. 4 is an explanatory view showing each gear of a speed reduction mechanism.
Figure 5:
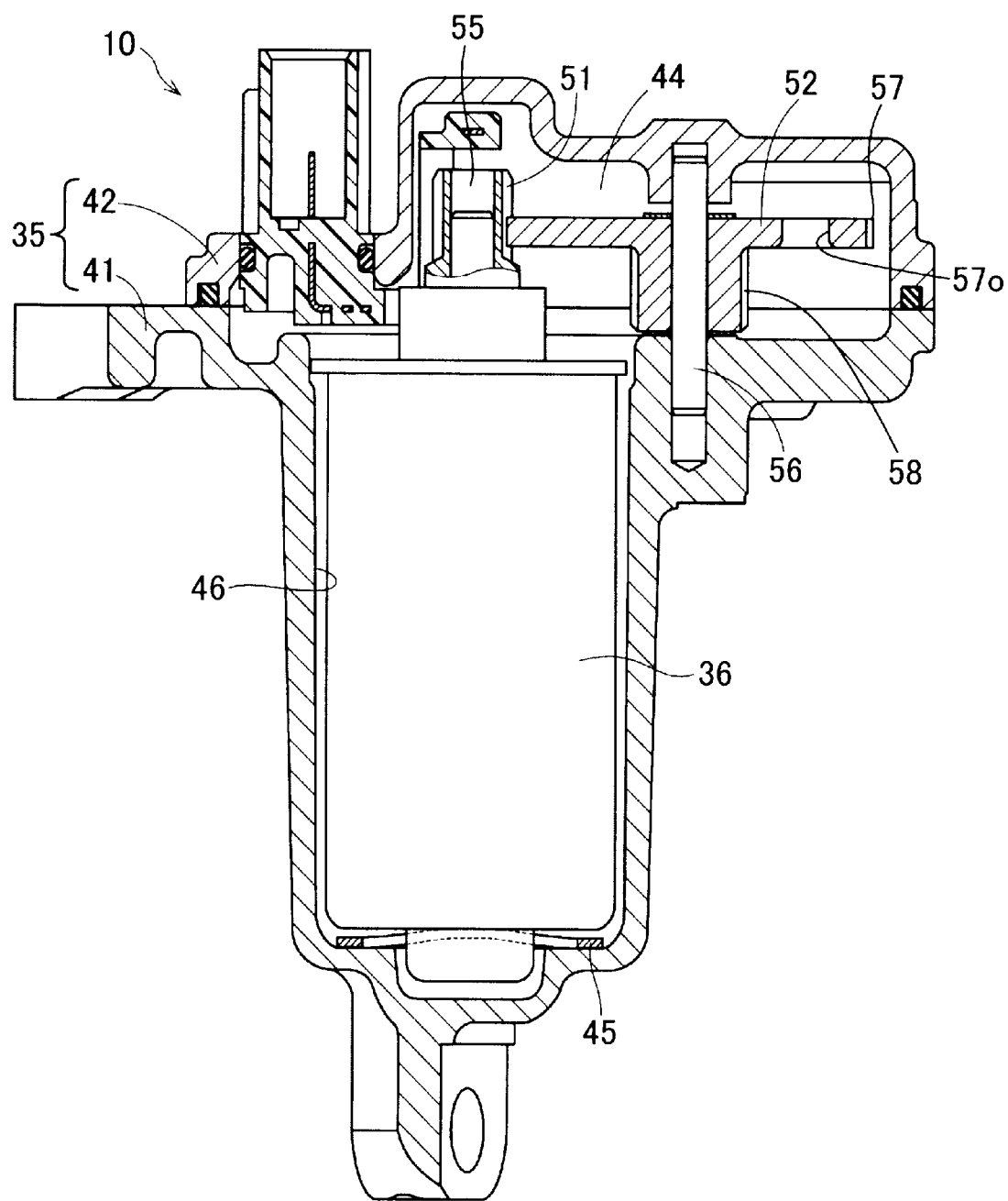
FIG. 5 is a cross-sectional view taken along a line V-V in FIG. 3.

As shown in FIGS. 4 and 5, the first housing portion 41 provides an accommodation space 44 together with the second housing portion 42. A motor 36 is accommodated within the accommodation space 44. Specifically, the motor 36 is inserted into a motor insertion hole 46 formed in the first housing portion 41 and is fixed to the first housing portion 41 by screws 47. A wave washer 45 is installed between the motor 36 and a bottom surface of the motor insertion hole 46. The wave washer 45 may not be provided. Regardless of the type, the motor 36 may be, for example, a known DC motor, a known stepping motor or the like.

Figure 6:
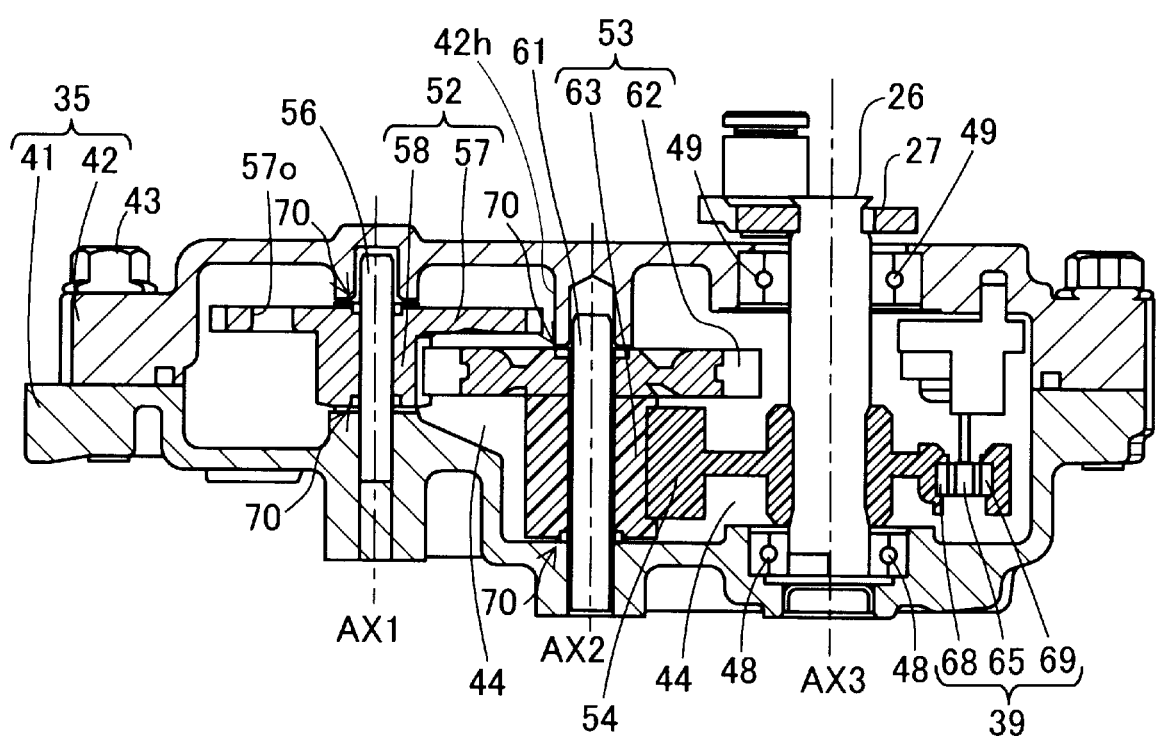
FIG. 6 is a cross-sectional view taken along line VI-VI in FIG. 3.

As shown in FIGS. 4 and 6, the actuator 10 has a speed reduction mechanism 37. The speed reduction mechanism 37 is a parallel shaft type speed reduction mechanism having a plurality of gears for reducing the rotation of the motor 36 and transmitting it to the output shaft 26. The plurality of gears includes a pinion gear 51, a first intermediate gear 52, a second intermediate gear 53 and an output gear 54.

The pinion gear 51 is fixed to a motor shaft 55 of the motor 36. The pinion gear 51 is a metal gear formed of metal. For example, an iron-based sintered metal is used to form the pinion gear 51.

The first intermediate gear 52 is a composite gear having a first large-diameter outer tooth portion 57 and a first small-diameter outer tooth portion 58, and is rotatably supported by a first metal shaft 56, which is a support shaft. The first large-diameter outer tooth portion 57 is a large-diameter gear and meshes with the pinion gear 51 fixed to the motor shaft 55 of the motor 36. The first small-diameter outer tooth portion 58 is a small-diameter gear having a smaller diameter than the first large-diameter outer tooth portion 57. The first large-diameter outer tooth portion 57 and the first small-diameter outer tooth portion 58 are both metal gears formed of metal. For example, an iron-based sintered metal is used to form the metal gear. The first large-diameter outer tooth portion 57 has a plurality of openings 57o in order to reduce inertia.

The second intermediate gear 53 is also a composite gear having a second large-diameter outer tooth portion 62 and a second small-diameter outer tooth portion 63, and is rotatably supported by a second metal shaft 61, which is a support shaft. The second large diameter outer tooth portion 62 is a large diameter gear and meshes with the first small diameter outer tooth portion 58 of the first intermediate gear 52. The second large-diameter outer tooth portion 62 is a metal gear made of metal. For example, an iron-based sintered metal is used to form the metal gear. The second small-diameter outer tooth portion 63 is a small-diameter gear having a smaller diameter than the second large-diameter outer tooth portion 62, and is a resin gear formed of resin. For example, a polyamide resin, a nylon resin, or a polyacetal resin is used to form the resin gear. The resin gear has less inertia than the metal gear. Therefore, when a large impact load is applied to the second intermediate gear 53 via the waste gate valve 19, the valve lever 29, the rod 28, the actuator lever 27, the output shaft 26 and the output gear 54 due to the exhaust pressure pulsation of the engine 11, the impact can be hardly transmitted to the upstream (motor side) gears including the second intermediate gear 53, the first intermediate gear 52 and the pinion gear 51, for example. Further, when a large impact load is applied to the output gear 54, the impact shock is hardly transmitted to the upstream gears (motor side) including the output gear 54, the second intermediate gear 53, the first intermediate gear 52 and the pinion gear 51, for example, because the output gear 54 is made of resin.

The output gear 54 meshes with the second small-diameter outer tooth portion 63, and the output shaft 26 is connected and fixed along the center axis AX3 of the output gear 54. The output gear 54 is a resin gear made of resin. As described above, the gears from the pinion gear 51 to the second large-diameter outer tooth portion 62 at the upstream side are metal gears, and the gears from the second small-diameter outer tooth portion 63 to the output gear 54 at the downstream side are resin gears. That is, the gears included in the speed reduction mechanism 37 are metal gears except for the output gear 54 and the second small-diameter outer tooth portion 63 of the second intermediate gear 53 that is a composite gear meshing with the output gear 54.

As shown in FIGS. 5 and 6, the actuator 10 includes the first housing portion 41 that houses the motor 36, the output shaft 26 and the speed reduction mechanism 37, and the second housing portion 42 that is the case for covering the first housing portion 41. One end of the second metal shaft 61 is fixed to the first housing portion 41, and the other end of the second metal shaft 61 is supported by a positioning portion 42h of the second housing portion 42. Therefore, compared to a case where one end of the second metal shaft 61 is fixed to the first housing portion 41 and the other end is not supported, it is possible to reduce tilting of the second metal shaft 61 due to vibration and torque caused by driving the motor 36 and pulsation from the waste gate valve 19. For example, when the second metal shaft 61 is tilted by the vibration and torque caused by the pulsation from the waste gate valve 19 and the assembled second intermediate gear 53 is also tilted, the second large-diameter outer tooth portion 62 and the second small-diameter outer tooth portion 63 are also tilted. At this time, in the meshing contact between the second large-diameter outer tooth portion 62 and the first small-diameter outer tooth portion 58, only a portion in the tooth distance direction comes into contact and a surface pressure of the contact portion increases. Thus, uneven wear is likely to occur in the second large-diameter outer tooth portion 62 and the first small-diameter outer tooth portion 58. The meshing of the second small-diameter outer tooth portion 63 and the output gear 54 is the same, and uneven wear is likely to occur in the second small-diameter outer tooth portion 63 and the output gear 54. On the other hand, when the second metal shaft 61 is tilted but the second intermediate gear 53 is not tilted, the second metal shaft 61 and the shaft hole 53h of the second intermediate gear 53 are not aligned in parallel, and uneven wear is likely to occur on the second metal shaft 61 and inner surface of the shaft hole 53h. By fixing one end portion of the second metal shaft 61 to the first housing portion 41 housing and supporting the other end portion by the positioning portion 42h of the second housing portion 42, such uneven wear can be suppressed.

As shown in FIG. 4, the output gear 54 is provided with magnets 66 and 67 that are magnetic flux generation portions and yokes 68 and 69 that are magnetic flux transmission portions. The magnets 66, 67 and the yokes 68, 69 form a magnetic circuit portion 64 that forms an arcuate closed magnetic circuit when viewed in the axial direction of the output shaft 26. The magnetic circuit portion 64 rotates integrally with the output gear 54 and the output shaft 26.

Inside the closed magnetic circuit of the magnetic circuit portion 64 of the output gear 54, a magnetic flux detection portion 65 is provided to detect the magnetic flux of the magnets 66 and 67. The magnetic flux detection portion 65 is configured by using, for example, a Hall IC. The magnetic circuit portion 64 and the magnetic flux detection portion 65 function as a rotation angle sensor 39 that detects a rotation angle of the output shaft 26. The configuration and the function of the magnetic circuit portion 64 and the magnetic flux detection portion 65 are known well in the art. The rotation angle of the output shaft 26 detected by the rotation angle sensor 39 is output to the ECU 22 shown in FIG. 1. The configurations of the magnetic circuit portion 64 and the magnetic flux detection portion 65 shown in FIG. 6 are merely exemplary, and any other configuration may be used.

As shown in FIG. 6, the output shaft 26 is rotatably supported by a bearing 48 provided in the first housing portion 41 and a bearing 49 provided in the second housing portion 42. One end portion of the output shaft 26 extends outward from the second housing portion 42 of the actuator housing 35. The actuator lever 27 is fixed to the output shaft 26 at the outside of the second housing portion 42.

As shown in FIGS. 6 and 7, at both ends of the first intermediate gear 52 in the direction along the first metal shaft 56, wear powder holding portions 70 are provided to hold the wear powder or foreign substance therein. At both ends of the second intermediate gear 53 in the direction along the second metal shaft 61, wear powder holding portions 70 are provided to hold the wear powder or foreign substance therein. Thus, the wear powder and the foreign substance are allowed to stay in the wear powder holding portions 70. Hereinafter, the wear powder holding portions 70 provided at both ends in the direction along the second metal shaft 61 of the second intermediate gear 53 will be described as an example. The wear powder holding portions 70 provided at the other both ends in the direction along the first metal shaft 56 of the first intermediate gear 52 may be configured similarly.

As shown in FIG. 7, the second intermediate gear 53 includes a shaft hole 53h. The second metal shaft 61 passes through the shaft hole 53h. One end portion of the second metal shaft 61 is fixed to the first housing portion 41, and the other end portion of the same is supported by the second housing portion 42. Here, one surface of the first housing portion 41 which is on the second intermediate gear 53 side is referred to as a first wall portion 41w, and one surface of the second housing portion 42 which is on the second intermediate gear 53 side is referred to as a second wall portion 42w. The second intermediate gear 53 is sandwiched between the first wall portion 41w and the second wall portion 42w to be able to rotate about the second metal shaft 61.

A cylindrical recess portion 53d that is recessed away from the second metal shaft 61 is formed at two ends of the shaft hole 53h of the second intermediate gear 53, and is not in contact with the second metal shaft 61. On the other hand, the axial center portion excluding the end portions of the shaft hole 53h forms a fitting portion 53c that fits the second metal shaft 61. The substantially cylindrical space formed by the recess portion 53d functions as the wear powder holding portion 70 that holds wear powder and the foreign substance. That is, the wear powder holding portion 70 is provided outside the outer periphery of the second metal shaft 61 and at the axial end of the shaft hole 53h.

As described above, according to the first embodiment, the wear powder holding portions 70 are provided radially outside the outer periphery of the second metal shaft 61 and at the axial ends of the shaft hole 53h. As a result, the scattering of the wear powder 80 and the like into the actuator 10 can be suppressed.

Moreover, according to the first embodiment, the wear powder holding portions 70 are provided outside the outer periphery of the second metal shaft 61 and at the axial ends of the shaft hole 53h, and not provided in other than the edge portions of the shaft hole 53h. For example, it is not provided in the middle portion of the fitting portion 53c that contacts the second metal shaft 61 of the second intermediate gear 53. As a result, the number of corners at the boundary between the wear powder holding portions 70 and the shaft hole 53h can be eliminated. Such contact by the corner becomes a line contact in the circumferential direction due to the rotation of the second intermediate gear 53, and the second metal shaft 61 and the inner peripheral surface of the shaft hole 53h are likely to be worn compared to the surface contact. According to the first embodiment, the number of corners at the boundary between the wear powder holding portion 70 and the shaft hole 53h can be eliminated, and wear of the second metal shaft 61 and the inner peripheral surface of the shaft hole 53h of the second intermediate gear 53 can be suppressed.

According to the first embodiment, the second metal shaft 61, the first wall portion 41w and the second wall portion 42w may be configured in the same structure as the case where the wear powder holding portions 70 are not provided. That is, the configuration can be simplified.

According to the first embodiment, the second intermediate gear 53 is reduced in weight because the material at the positions corresponding to the wear powder holding portions 70 is removed. Therefore, the inertia of the second intermediate gear 53 can be reduced.

According to the first embodiment, when the second intermediate gear 53 is to be assembled to the second metal shaft 61, the recess portion 53d can be used as an invitation or guide portion. In the above description, the recess portion 53d is exemplified as having a substantially cylindrical shape, but may have a truncated cone shape in which the first wall portion 41w side and the second wall portion 42w side are widened.

Second Embodiment

As shown in FIG. 8, in a second embodiment, a diameter d2 of the second metal shaft 61 in an axial center portion 61c inside both ends in the direction along the second metal shaft 61 is larger than a diameter d1 of the both end portions excluding the center portion 61c. The shaft hole 53h of the second intermediate gear 53 has an inner diameter that can accommodate the central portion 61c of the second metal shaft 61. The second metal shaft 61 and the second intermediate gear 53 are not in contact with each other on both end sides in the direction along the second metal shaft 61 with respect to the center portion 61c, and a substantially cylindrical space is formed. This substantially cylindrical space functions as a wear powder holding portion 71 that holds the wear powder 80 and foreign substance at two end portions of the shaft hole 53h. That is, the wear powder holding portion 71 is provided outside the outer periphery of the second metal shaft 61 and at the axial end portions of the shaft hole 53h.

As described above, according to the second embodiment, the wear powder holding portion 71 is provided radially outside the outer periphery of the second metal shaft 61 and at the axial end portions of the shaft hole 53h. As a result, the scattering of the wear powder 80 and the like into the actuator 10 can be suppressed.

Further, according to the second embodiment, the wear powder holding portion 71 is not provided in the middle of the fitting portion 53c that contacts the second metal shaft 61 of the second intermediate gear 53, as not in the first embodiment. As a result, the number of corners at the boundary between the wear powder holding portion 71 and the shaft hole 53h can be eliminated. Such contact by corners tends to wear the contact portion more in comparison to a case of surface contact. According to the second embodiment, the number of corners at the boundary between the wear powder holding portion 71 and the shaft hole 53h can be eliminated, and wear of the second metal shaft 61 and the inner peripheral surface of the shaft hole 53h of the second intermediate gear 53 can be suppressed.

According to the second embodiment, the second intermediate gear 53, the first wall portion 41w and the second wall portion 42w may be configured in the same structure as the case where the wear powder holding portion 71 is not provided. That is, the configuration can be simplified.

According to the second embodiment, a cross-sectional area perpendicular to the axis of the second metal shaft 61 in the wear powder holding portion 71 is smaller than a cross-sectional area perpendicular to the axis of the second metal shaft 61 at a position other than the wear powder holding portion 71. As a result, when the second intermediate gear 53 is to be assembled to the second metal shaft 61, the second metal shaft 61 is easily guided into the opening of the second intermediate gear 53.

Third Embodiment

As shown in FIG. 9, in a third embodiment, the first wall portion 41w of the first housing portion 41 includes a cylindrical recess portion 41d around the second metal shaft 61, and the second wall portion 42w of the second housing portion 42 includes a cylindrical recess portion 42d around the second metal shaft 61. In the recess portions 41d and 42d, inner peripheral surfaces 41s and 42s, which are circumferential surfaces, and the second metal shaft 61 are not in contact with each other, and substantially cylindrical spaces are formed. These substantially cylindrical spaces function as wear powder holding portions 72 that holds the wear powder 80 and foreign substance. That is, the wear powder holding portions 72 are provided in the fitting portion between the second metal shaft 61 and the first wall portion 41w and the fitting portion between the second metal shaft 61 and the second wall portion 42w. In the wear powder holding portions 72, the second metal shaft 61 and the inner peripheral surface of the shaft hole 53h of the second intermediate gear 53 are not in contact with each other.

As described above, according to the third embodiment, the wear powder holding portions 72 are provided in the fitting portions between the second metal shaft 61 and the first wall portion 41w and the second wall portion 42w. As a result, the wear powder 80 and the like can be held in the wear powder holding portion 72, and scattering of the wear powder 80 and the like into the actuator 10 can be suppressed.

According to the third embodiment, in the wear powder holding portion 72, the second metal shaft 61 and the inner peripheral surface of the shaft hole 53h of the second intermediate gear 53 are not in contact with each other. Therefore, even if the second intermediate gear 53 rotates around the second metal shaft 61, the second metal shaft 61 and the inner peripheral surface of the shaft hole 53h of the second intermediate gear 53 are less likely to be worn by the corner of the wear powder holding portion 72. That is, wear on the second metal shaft 61 and the inner peripheral surface of the shaft hole 53h of the second intermediate gear 53 can be suppressed.

According to the third embodiment, when the second intermediate gear 53 is assembled to the second metal shaft 61, the second metal shaft 61 can be easily guided into the opening of the second intermediate gear 53.

According to the third embodiment, the second intermediate gear 53 and the second metal shaft 61 may be configured in the same structure as in the case where the wear powder holding portion 71 is not provided. That is, the configuration can be simplified. Moreover, the distance of the fitting portion 61c which contacts the second intermediate gear 53 of the second metal shaft 61 can be distanceened. As a result, the second intermediate gear 53 can be hardly tilted relative to the second metal shaft 61. As a result, uneven wear of the second large-diameter outer tooth portion 62 and the first small-diameter outer tooth portion 58 or uneven wear of the second metal shaft 61 and the inner surfaces of the shaft hole 53h can be suppressed.

Fourth Embodiment

As shown in FIG. 10, in a fourth embodiment, wear powder holding portions 73 are provided. The wear powder holding portion 73 is shaped to have a combined shape of the wear powder holding portion 71 provided in the second embodiment and the wear powder holding portion 72 provided in the third embodiment. Therefore, also in the fourth embodiment, similarly to the first embodiment and the third embodiment, the wear powder 80 and the like can be held in the wear powder holding portions 73 and scattering of the wear powder 80 and the like into the actuator 10 can be suppressed. Further, the number of corners at the boundary between the wear powder holding portion 73 and the shaft hole 53h can be eliminated, and wear of the second metal shaft 61 and the inner peripheral surface of the shaft hole 53h of the second intermediate gear 53 can be suppressed.

According to the above first to fourth embodiments, each embodiment includes the second intermediate gear 53 having the shaft hole 53h, the second metal shaft 61 inserted into the shaft hole 53h and rotatably holding the second intermediate gear 53, and the first wall portion 41w and the second wall portion 42w provided on both ends of the second metal shaft 61 in a manner to sandwich the second intermediate gear 53. In each embodiment, the wear powder holding portion 70, 71, 72, 73 is provided radially outside the outer periphery of the second metal shaft 61 and around the axial end of the shaft hole 53h and the second metal shaft 61 of the first wall portion 41w and the second wall portion 42w in a manner to hold the wear powder and foreign substance cumulatively. By adopting such a configuration, it is possible to hold the wear powder 80 and the like in the wear powder holding portion 70, 71, 72, 73, and to suppress scattering of the wear powder 80 and the like into the actuator 10. That is, wear on the second metal shaft 61 and the inner peripheral surface of the shaft hole 53h of the second intermediate gear 53 can be suppressed. It is noted that the wear powder holding portion 70, 71, 72, 73 need not necessarily be provided at all positions around the end portion of the shaft hole 53h and the first wall portion 41w and the second wall portion 42w of the second metal shaft 61. That is, the number of the wear powder holding portion 70, 71, 72, 73 need not necessarily be plural but may be only one.

Further, the configuration of the wear powder holding portion 70 provided in the first embodiment may be used as the wear powder holding portion on the first wall 41w side, and the configuration of wear powder holding portion 72 provided in the third embodiment may be used as the wear powder holding portion on the second wall 42w side. That is, the wear powder holding portion 70 of the first embodiment and the wear powder holding portion 72 of the third embodiment may be combined appropriately. Further, the configuration of the wear powder holding portion 71 provided in the second embodiment may be used as the wear powder holding portion on the first wall 41w side, and the configuration of the wear powder holding portion 73 described in the fourth embodiment may be used as the wear powder holding portion on the second wall 42w side. That is, the wear powder holding portion 71 of the second embodiment and the wear powder holding portion 73 of the third embodiment may be combined appropriately. Moreover, the second embodiment and the fourth embodiment may be combined. For example, as in the fourth embodiment, the first wall portion 41w and the second wall portion 42w may be provided with recess portions 41d and 42d having diameters larger than the diameter d2 of the second metal shaft 61, the center portion 61c of the diameter d2 of the second metal shaft 61 of the second embodiment may be extended until it enters the first wall portion 41w and the second wall portion 42w, and a wear powder holding portion may be provided to be surrounded by the outer periphery of the second metal shaft 61 and the recess portions 41d and 42d.

Fifth Embodiment

In a fifth embodiment shown in FIG. 11, differently from the third embodiment shown in FIG. 9, the second intermediate gear 53 includes protruding portions 53e that protrude in the direction along the second metal shaft 61. The protruding portions 53e enter the wear powder holding portion 72. In this configuration, a distance G1 in a radial direction between an inner peripheral surface 41s and the protruding portion 53e is equal to or larger than a distance G3 in the radial direction between the second metal shaft 61 and the shaft hole 53h of the second intermediate gear 53. Here, the distance G3 is calculated by [(diameter of shaft hole 53h)−(diameter of second metal shaft 61)]/2. In this way, it is possible to make the inner peripheral surface 41s and the protruding portion 53e hardly come into contact with each other. It is noted that an upper limit value of the distance G1 may be larger than the distance G3 and equal to 2×G3 or less. This is because if the distance G1 is this size, scattering of the held wear powder from the wear powder holding portion 72 can be suppressed. The second intermediate gear 53 includes the protruding portion 53e having a similar configuration on the second wall portion 42w side as well.

According to the fifth embodiment, since wear powder or the like is unlikely to pass between the inner peripheral surface 41s and the protruding portion 53e, scattering of wear powder or the like from the wear powder holding portion 72 can be suppressed.

In the fifth embodiment, a distance G2 in the axial direction between a top end of the protruding portion 53e and a recess portion 41d may be the same as the distance G1 between the inner peripheral surface 41s and the protruding portion 53e. Even in this case, the wear powder or the like is unlikely to pass through between the top end of the protruding portion 53e and the recess portion 51d, so that the scattering of the wear powder or the like from the wear powder holding portion 72 can be suppressed.

Sixth Embodiment

In a sixth embodiment shown in FIG. 12, differently from the fifth embodiment shown in FIG. 11, the protruding portions 53e are thickened to be substantially equal to the shaft hole 53h of the second intermediate gear 53. In the sixth embodiment, the distance G1 between the inner peripheral surface 41s and the protruding portion 53e is equal to or larger than the distance G3 between the second metal shaft 61 and the shaft hole 53h of the second intermediate gear 53 but equal to or smaller than 2×G3. The second wall portion 42w side also includes the protruding portion 53e having a similar configuration.

According to the sixth embodiment, since wear powder or the like is unlikely to pass between the inner peripheral surface 41s and the protruding portion 53e similarly to the fifth embodiment, scattering of wear powder or the like from the wear powder holding portion 72 can be suppressed.

According to the sixth embodiment, since the protruding portion 53e is thickened to be substantially the same as the shaft hole 53h of the second intermediate gear 53, a distance of the fitting portion 53c that contacts the second metal shaft 61 of the second intermediate gear 53 can be increased. As a result, the second metal shaft 61 can be made to be hardly tilted relative to the second metal shaft 61.

Seventh Embodiment

Figure 13:
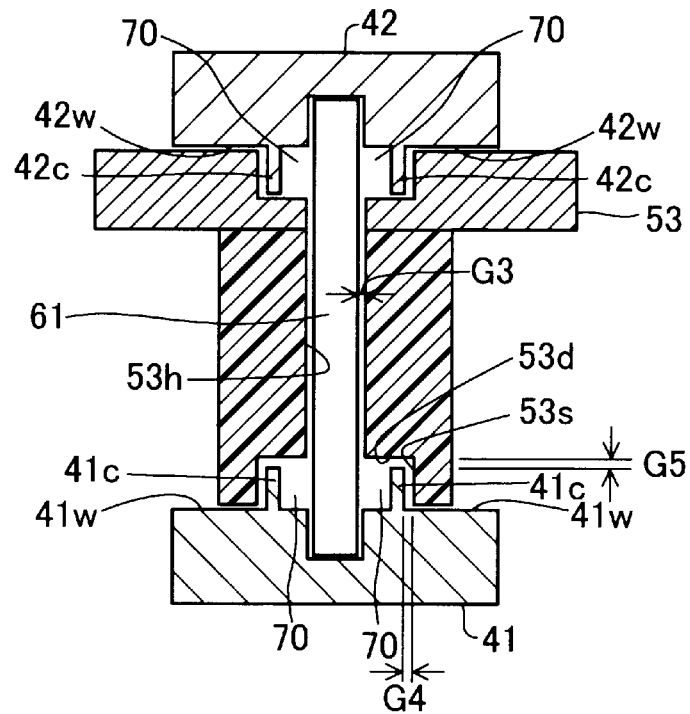
FIG. 13 is an explanatory view showing a wear powder holding portion of an actuator according to a seventh embodiment.

In a seventh embodiment shown in FIG. 13, differently from the first embodiment shown in FIG. 7, the first wall portion 41w includes a protruding portion 41c that protrudes in the direction along the second metal shaft 61. The protruding portion 42c enters the wear powder holding portion 70. A distance G4 between the inner peripheral surface 53s and the protruding portion 41c is equal to or larger than the distance G3 between the second metal shaft 61 and the shaft hole 53h of the second intermediate gear 53 but equal to or smaller than 2×G3. The second wall portion 42w is also provided with the protruding portion 42c of the same structure.

According to the seventh embodiment, since wear powder or the like is unlikely to pass between the inner peripheral surface 53s and the protruding portion 41c, scattering of wear powder or the like from the wear powder holding portion 70 can be suppressed.

In the seventh embodiment, a distance G5 in the axial direction between a top end of the protruding portion 41c and the recess portion 53d may be substantially the same as the distance G1 between the inner peripheral surface 41s and the protruding portion 53e. Even in this case, the wear powder or the like is unlikely to pass through between the top end of the protruding portion 41c and the recess portion 53d, so that the scattering of the wear powder or the like from the wear powder holding portion 72 can be suppressed.

Eighth Embodiment

Figure 14:
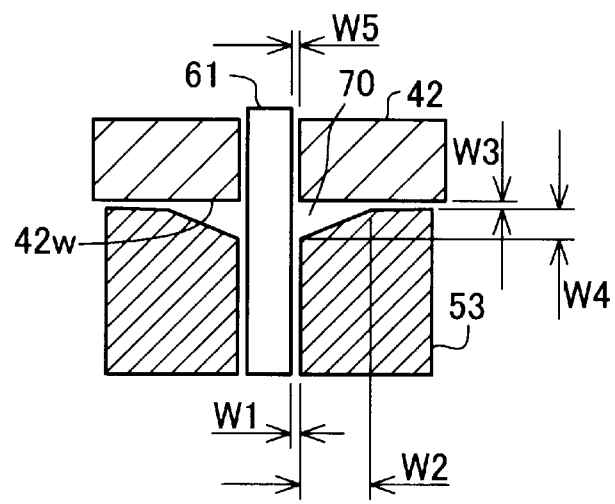
FIG. 14 is an explanatory view showing a wear powder holding portion of an actuator according to an eighth embodiment.

In an eighth embodiment shown in FIG. 14, the wear powder holding portion 70 has a truncated cone shape in which a boundary surface side between the second wall portion 42w and the second intermediate gear 53 increases. Similarly, wear powder or the like can be held. Further, as the wear powder holding portion 70 has the truncated cone shape, the wear powder holding portion 70 serves as a guide when the second metal shaft 61 is inserted into the second intermediate gear 53, and the second intermediate gear 53 is easily assembled to the second metal shaft 61.

Next, dimensional relation between the structural members described above and a size of the recess portion will be described. Assuming that a distance in the radial direction between the second metal shaft 61 and the second intermediate gear 53 is W1 and a distance of the wear powder holding portion 70 of the second intermediate gear 53 in the radial direction is W2, the distance W2 is larger than the distance W1. With the wear powder holding portion 70 provided in this way, it is easier to hold the wear powder or the like in the wear powder holding portion 70 than in case of making the distance W2 the same size as the distance W1, and the wear on the second metal shaft 61 and the inner peripheral surface of the shaft hole 53h of the second intermediate gear 53 can be suppressed.

Assuming that a distance in the axial direction between the second intermediate gear 53 and the second wall portion 42w is W3 and a distance (depth) of the wear powder holding portion 70 in the direction along the second metal shaft 61 is W4, the distance W4 is larger than the distance W3. With the wear powder holding portion 70 provided in this way, it is easier to hold the wear powder or the like in the wear powder holding portion 70 than in case of making the distance W4 the same size as the distance W3, and the wear on the second metal shaft 61 and the inner peripheral surface of the shaft hole 53h of the second intermediate gear 53 can be suppressed.

Assuming that a distance between the second metal shaft 61 and an inner peripheral surface of a shaft hole of the second housing portion 42 is W5, the distance W2 is larger than the distance W5. With the wear powder holding portion 70 configured in this way, it is easier to hold the wear powder or the like in the wear powder holding portion 70 than in case of making the distance W2 the same size as the distance W5, and the wear of the second metal shaft 61 and the inner peripheral surface of the shaft hole 53h of the second intermediate gear 53 can be suppressed.

In the eighth embodiment, the wear powder holding portion 70 having the truncated cone shape is provided in the second intermediate gear 53. However, in the third embodiment shown in FIG. 9, the wear powder holding portion 72 may also have the truncated cone shape. Further, in the fourth embodiment shown in FIG. 10 as well, the wear powder holding portions 70 and 72 may each have the truncated cone shape.

Ninth Embodiment

Figure 15:
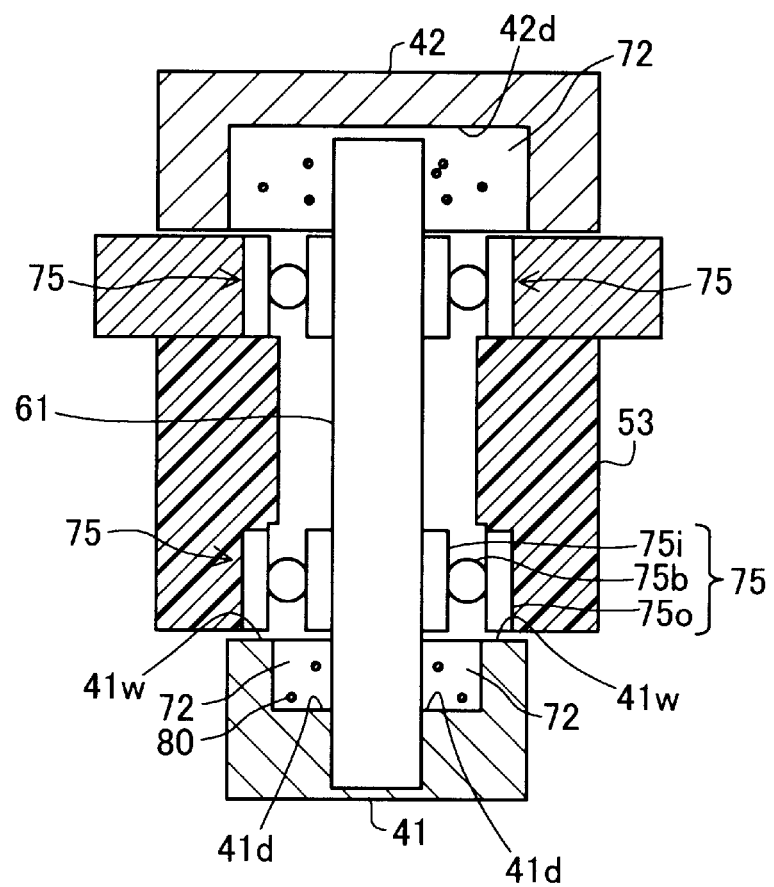
FIG. 15 is an explanatory view showing a wear powder holding portion of an actuator according to a ninth embodiment.

In a ninth embodiment shown in FIG. 15, bearings 75 are provided in the wear powder holding portions 71 of the fourth embodiment shown in FIG. 10. The bearing 75 includes an inner ring 75i, an outer ring 75o and bearing balls 75b. The inner ring 75i is fixed to the second metal shaft 61, and the outer ring 75o is fixed to each axial end of the shaft hole 53h of the second intermediate gear 53.

According to the ninth embodiment, the bearings 75 are provided between the second metal shaft 61 and the second intermediate gear 53, and hence the generation amount of the wear powder 80 and the like can be reduced. In the ninth embodiment, a ball bearing using the bearing ball 75b is used as the bearing 75. However, a roller bearing using a cylindrical or barrel roller, a needle bearing using a needle, or the like, may be used. These bearings do not use the bearing ball 75.

In the ninth embodiment, since the inner rings 75i are fixed to the second metal shaft 61, and the outer rings 75o are fixed to the ends of the shaft hole 53h of the second intermediate gear 53, the position of the second intermediate gear 53 in the direction of the second metal shaft 61 can be fixed. Thus, the meshing of the gears can be stabilized. Moreover, the distance between the second intermediate gear 53 and the first wall portion 41w and the second wall portion 42w can be maintained to a fixed distance, generation of the wear powder 80 and the like is suppressed and the mechanical loss in torque transmission can be reduced. It is noted that a configuration in which one of the inner ring 75*i* and the outer ring 75*o* is fixed and the other is free may be employed. This is because, with one of the inner ring 75*i* and the outer ring 75*o* being fixed, the position of the second intermediate gear 53 in the direction along the second metal shaft 61 can be substantially fixed.

In the first to ninth embodiments described above, the second intermediate gear 53 is a hybrid gear in which the second small-diameter outer tooth portion 63 including the shaft hole 53*h* is the resin gear and the second large-diameter outer tooth portion 62 is the metal gear. However, both the second small-diameter outer tooth portion 63 including the shaft hole 53*h* therein and the second large-diameter outer tooth portion 62 may be resin gears or metal gears. The second metal shaft 61 is the metal shaft, but may be a resin shaft. In the first to ninth embodiments, in case that at least one of the shaft hole 53*h* of the second intermediate gear 53 and the second metal shaft 61 is formed of metal, magnetic powder is generated as the wear powder. The magnetic powder can be held in the wear powder holding portion 70, 71, 72, 73 and prevented from adhering to the magnetic circuit portion 64.

In the first to ninth embodiments, the inner peripheral surfaces 41*s*, 42*s* and 53*s* of the wear powder holding portions 70, 71, 72 and 73 are formed exemplarily in the cylindrical surface shape or conical surface shape. However, these inner peripheral surfaces may be formed in a side surface shape of a polygonal column or a side surface shape of a polygonal frustum.

In the first to ninth embodiments, the configuration around the second intermediate gear 53 is described as an example. However, the same configuration may also be adopted around the first intermediate gear 52.

In the first to ninth embodiments, the second intermediate gear 53 includes the wear powder holding portions 70, 71, 72, 73 on both the first wall portion 41*w* side and the second wall portion 42*w* side. Alternatively, the second intermediate gear 53 may be configured to include the wear powder holding portions 70, 71, 72, 73 only on either one of the first wall portion 41*w* side and the second wall portion 42*w* side. The wear powder can be held even in any one of the wear powder holding portions 70, 71, 72, 73 on the first wall portion 41*w* side and the second wall portion 42*w* side.

In the above embodiments, the wear powder holding portion 70, 71, 72, 73 is provided exemplarily for the second intermediate gear 54 of the actuator 10 that drives the waste gate valve 19 that is the turbocharging pressure control valve of the turbocharger 24. However, the similar configuration may be provided in any mechanism having a gear rotating around a shaft. The similar configuration may also be adopted for one gear that is not a composite gear including a large-diameter gear and a small-diameter gear such as the first intermediate gear 52 and the second intermediate gear 53.

The present disclosure should not be limited to the embodiments described above, and various other embodiments may be implemented without departing from the scope of the present disclosure. For example, the technical features in the embodiments can be replaced or combined as appropriate.

The present disclosure can be realized in the following forms.

(1) According to one realization form, an actuator is provided. The actuator includes a motor, an output shaft and a speed reduction mechanism that transmits the rotation of the motor by speed reduction to the output shaft. The speed reduction mechanism includes at least one gear having a shaft hole, a shaft inserted into the shaft hole and rotatably holding the gear, and wall portions provided to sandwich the gear at both ends of the shaft. The speed reduction mechanism further includes a wear powder holding portion which is provided radially outside an outer periphery of the shaft and in at least one of two end portions of the shaft hole to hold wear powder and foreign substance therein and not to be scattered.

(2) In the above realization form, an opening area of the shaft hole in the wear powder holding portion of the gear may be larger than an opening area of the shaft hole in a place other than the wear powder holding portion. According to this opening area, the configuration of the shaft or the wall portion can be simplified. Moreover, since the gear can be reduced in weight, the inertia of the gear can be reduced. When the gear is to be assembled to the shaft, the opening can be used as a guide mechanism.

(3) In the above realization form, a cross-sectional area perpendicular to the axis of the shaft in the wear powder holding portion may be smaller than a cross-sectional area perpendicular to the axis of the shaft in places other than the wear powder holding portion. According to this opening area, the configuration of the gear and the wall portion can be simplified. Since the cross-sectional area perpendicular to the axis of the shaft in the wear powder holding portion is smaller than the cross-sectional area perpendicular to the shaft axis at a place other than the wear powder holding portion, it is easy to assemble the gear on the shaft because the wear powder holding portion functions as a guide when the gear is assembled to the shaft.

(4) In the above realization form, the wear powder holding portion may be provided as recess portions formed in the wall portion. With this wear powder holding portion, the configuration of the gear and the shaft can be simplified. In addition, a distance of contact between the gear and the shaft can be increased in a direction along the shaft.

(5) In the above realization form, the gear may have a protruding portion protruding in a direction along the shaft and entering the wear powder holding portion. According to this configuration, the protruding portions can hold the wear powder or the like in the wear powder holding portion, and can suppress the scattering of the wear powder or the like from the wear powder holding portion.

(6) In the above realization form, the recess portion may have a protruding portion protruding in the direction along the shaft and entering the wear powder holding portion. According to this configuration, the protruding portion can hold the wear powder or the like in the wear powder holding portion, and can suppress the scattering of the wear powder or the like from the wear powder holding portion.

(7) In the above realization form, a radial distance of the gear in the wear powder holding portion may be larger than a distance between the shaft and the gear in a place other than the wear powder holding portion. According to this configuration, it is possible to easily hold the wear powder or the like in the wear powder holding portion and suppress wear of the shaft and an inner peripheral surface of the shaft hole of the gear, rather than making the distance in the radial direction of the gear in the wear powder holding portion the same as the distance between the shaft and the gear.

(8) In the above realization form, a distance in the direction along the shaft in the wear powder holding portion may be larger than a distance between the gear and the wall portion. According to this configuration, it is easier to hold the wear powder or the like in the wear powder holding portion and suppress the wear of the shaft and the inner peripheral surface of the shaft hole of the gear than in case of making the distance in the direction along the shaft in the wear powder holding portion the same as the distance between the gear and the wall portion. Moreover, scattering of the wear powder or the like from the wear powder holding portion can be suppressed.

(9) In the above realization form, the distance of the gear in the wear powder holding portion may be larger than a distance between the wall portion and the shaft. According to this configuration, it is possible to more easily hold the wear powder or the like in the wear powder holding portion and suppress wear of the shaft and the inner peripheral surface of the shaft hole of the gear than in a case of making the radial size of the gear in the wear powder holding portion the same as the distance between the wall portion and the shaft. Moreover, scattering of the wear powder or the like from the wear powder holding portion can be suppressed.

(10) In the above realization form, one of the wall portions may fix the shaft and the other of the wall portions may have a positioning portion which positions the shaft without fixing. According to this configuration, the positional relationship between the two wall portions can be determined.

(11) In the above realization form, the wall portions may be provided on a housing portion, which houses the speed reduction mechanism therein, and a case portion, which covers the housing portion. According to this configuration, the number of components can be decreased by providing the wall portions on the housing portion and the case portion.

(12) In the above realization form, a rolling bearing may be provided in a fitting portion between the gear and the shaft, and the rolling bearing may have a configuration in which an outer ring is fixed to the gear or an inner ring is fixed to the shaft. According to this configuration, a generation amount of wear powder can be reduced.

(13) In the above realization form, the outer ring and the inner ring of the rolling bearing may be fixed to the gear and the shaft, respectively. According to this configuration, since the position of the gear along the shaft can be fixed, the meshing of the gear can be stabilized. Moreover, since the distance between the gear and the wall portion can be kept at a fixed distance, production of friction powder or the like can be suppressed and the mechanical loss in torque transmission can be reduced.

(14) In the above realization form, a magnetic circuit portion for generating a magnetic flux for detecting a rotational position of the gear and a magnetic flux detection portion for detecting the magnetic flux may be provided. According to this configuration, it is possible to detect the rotational position of the gear.

(15) In the above realization form, at least one of the shaft holes of one or more gears of the speed reduction mechanism and the shaft may be made of metal. According to this configuration, even in case that the shaft hole and the shaft of the gear are formed of metal, which is a magnetic material, it is possible to hold the wear powder that is a magnetic body in the wear powder holding portion and prevent it from adhering to the magnetic circuit portion. As a result, a magnetic characteristic variation can be suppressed and the rotational position can be detected with high accuracy.

(16) In the above realization form, the actuator may be adapted to drive a turbocharging pressure control valve of a turbocharger.

The present disclosure can be realized in other forms. For example, in addition to an actuator used for opening and closing a waste gate valve of a turbocharger, it may be realized as an actuator for switching a twin turbo turbine including two turbines, or an actuator for controlling a turbocharging pressure in a turbocharger, such as an actuator for switching a turbine of a variable capacity turbocharger.

What is claimed is:

1. An actuator comprising:
a motor;
an output shaft; and
a speed reduction mechanism for transmitting rotation of the motor to the output shaft by reducing a rotation speed,
wherein the speed reduction mechanism includes:
at least one gear having a shaft hole;
a support shaft inserted into the shaft hole and holding the gear rotatably;
wall portions provided at both ends of the support shaft in a manner sandwiching the gear; and
a wear powder holding portion provided radially outside an outer periphery of the support shaft and in at least one of two end portions of the shaft hole and the wall portions in a manner to hold wear powder or foreign substance without scattering.

2. The actuator according to claim 1, wherein:
an opening area of the shaft hole in the wear powder holding portion of the gear is larger than an opening area of the shaft hole which is other than the wear powder holding portion.

3. The actuator according to claim 1, wherein:
a cross-sectional area of the support shaft perpendicular to an axis of the support shaft at the wear powder holding portion is smaller than a cross-sectional area of the support shaft perpendicular to the axis of the support shaft at a position other than the wear powder holding portion.

4. The actuator according to claim 1, wherein:
the wear powder holding portion is formed as a recess portion formed in the wall portion.

5. The actuator according to claim 4, wherein:
the gear includes a protruding portion protruding in a direction along the support shaft and entering the wear powder holding portion.

6. The actuator according to claim 4, wherein:
the recess portion includes a protruding portion protruding in a direction along the support shaft and entering the wear powder holding portion provided in the gear.

7. The actuator according to claim 1, wherein:
a radial distance of the wear powder holding portion in the gear is larger than a distance between the support shaft and the gear at a position other than the wear powder holding portion.

8. The actuator according to claim 1, wherein:
a distance in a direction along the shaft at the wear powder holding portion is larger than a distance between the gear and the wall portion.

9. The actuator according to claim 1, wherein:
a radial distance of the wear powder holding portion in the gear is larger than a distance between the support shaft and the wall portion.

10. The actuator according to claim 1, wherein:
one of the wall portions fixes the support shaft; and
the other of the wall portions includes a positioning portion for positioning the support shaft without fixing.

11. The actuator according to claim 1, further comprising:
a housing portion for accommodating the speed reduction mechanism therein; and
a case portion for covering the housing portion,
wherein the wall portions are provided in the housing portion and the case portion.

12. The actuator according to claim 1, further comprising:
a rolling bearing provided at a fitting portion between the gear and the support shaft,
wherein the rolling bearing has at least one of a configuration in which an outer ring is fixed to the gear and a configuration in which an inner ring is fixed to the support shaft.

13. The actuator according to claim 12, wherein:
the outer ring of the rolling bearing is fixed to the gear and the inner ring is fixed to the support shaft.

14. The actuator according to claim 1, further comprising:
a magnetic circuit portion for generating a magnetic flux for detecting a rotational position of the gear; and
a magnetic flux detection portion for detecting the magnetic flux generated by the magnetic circuit portion.

15. The actuator according to claim 1, wherein:
at least one of the shaft hole of at least one of the gears of the speed reduction mechanism and the support shaft is made of metal.

16. The actuator according to claim 1, wherein:
the output shaft is connected to drive a turbocharging pressure control valve of a turbocharger.

* * * * *